(12) United States Patent
Song et al.

(10) Patent No.: US 7,013,775 B1
(45) Date of Patent: Mar. 21, 2006

(54) CENTER REFERENCE ADJUSTABLE CUTTER HOLDER FOR CNC LATHE

(76) Inventors: Yeo-Ching Song, No. 29, Lane 116, Yenping N. Rd., Sec. 6, Shihlin Dist., Taipei City (TW); Ting-Tsai Hsu, No. 17, Lane 111, Hoping Rd., Luchou City, Taipei County (TW)

( * ) Notice: Subject to any disclaimer, the term of this patent is extended or adjusted under 35 U.S.C. 154(b) by 0 days.

(21) Appl. No.: 11/190,904

(22) Filed: Jul. 28, 2005

(51) Int. Cl.
*B32B 29/04* (2006.01)

(52) U.S. Cl. ............................. 82/158; 82/159; 82/160; 29/40

(58) Field of Classification Search ................. 82/158, 82/159, 160; 29/40; 408/35
See application file for complete search history.

(56) References Cited

U.S. PATENT DOCUMENTS

| 3,005,365 | A | * | 10/1961 | Billman | 408/116 |
| 5,063,799 | A | * | 11/1991 | Brewer | 82/158 |
| 5,417,131 | A | * | 5/1995 | Robertson | 82/158 |
| 6,003,415 | A | * | 12/1999 | Turner et al. | 82/159 |

* cited by examiner

Primary Examiner—Willmon Fridie, Jr.
(74) Attorney, Agent, or Firm—Rosenberg, Klein & Lee

(57) ABSTRACT

A cutter holder for CNC lathe is disclosed to include a bottom holder block, which is affixed to the frame of a CNC lathe with screws and has a positioning groove with a middle semispherical recess for holding a barrel that holds a tool shank with a front chuck for holding a cutting tool, and a top holding down block, which is detachably affixed to the bottom holder block with screws to hold down the barrel and has a semispherical bottom recess fitting the spherical middle flank portion of the barrel corresponding to the middle semispherical recess of the bottom holder block.

2 Claims, 5 Drawing Sheets

US 7,013,775 B1

CENTER REFERENCE ADJUSTABLE CUTTER HOLDER FOR CNC LATHE

BACKGROUND OF THE INVENTION

1. Field of the Invention

The present invention relates to a CNC lathe and more specifically, to a center reference adjustable cutter holder for use in a CNC lathe.

2. Description of the Related Art

FIGS. 5 and 6 show a cutter holder 6 for a conventional CNC lathe. As illustrated, the cutter holder 6 comprises a mounting hole 61, a barrel 611 mounted in the mounting hole 61, and a tool shank 7 mounted in the barrel 611. The tool shank 7 has a front chuck 71 adapted to hold a cutting tool 8. The cutter holder 6 is fastened to the frame 4 of the CNC lathe with screws 612, enabling the cutting tool 8 to work on the workpiece 9 at the workpiece chuck 5. According to this design, the parts of the cutter holder 6 are not adjustable relative to one another, therefore it is difficult to calibrate the position of the cutter holder 6 relative to the workpiece chuck 5. The operator may be unable to find inaccurate position of the cutting tool 8 when working the workpiece 9, resulting in a poor processing quality or damage of the parts of the machine.

SUMMARY OF THE INVENTION

The present invention has been accomplished under the circumstances in view. It is therefore the main object of the present invention to provide a center reference adjustable cutter holder for CNC lathe, which enables the operator to calibrate the position of the cutting tool accurately, achieving a high quality cutting work. To achieve this and other objects of the present invention, the cutter holder comprises a bottom holder block, a holding down block, and a barrel. The bottom holder block comprises a top wall, a positioning groove formed in the top wall and extending through front and rear sides thereof, a plurality of mounting through holes disposed at two sides relative to the positioning groove and fastened to a frame at a CNC lathe with screws, a plurality of screw holes symmetrically disposed at two sides relative to the positioning groove, and a semispherical recess formed in the top wall on a middle part of the positioning groove. The barrel fits the positioning groove of the bottom holder block, having a spherical middle flank portion fitting the semispherical recess of the bottom holder block, and a center hole extending through two distal ends thereof for holding a tool shank. The holding down block is adapted to hold down the barrel in the positioning groove of the bottom holder block, having a semispherical bottom recess fitting the spherical middle flank portion of the barrel and a plurality of mounting through holes disposed at two sides of the semispherical bottom recess and respectively fastened to the screw holes of the bottom holder block with a respective screw.

DETAILED DESCRIPTION OF THE PREFERRED EMBODIMENT

Figure 1:
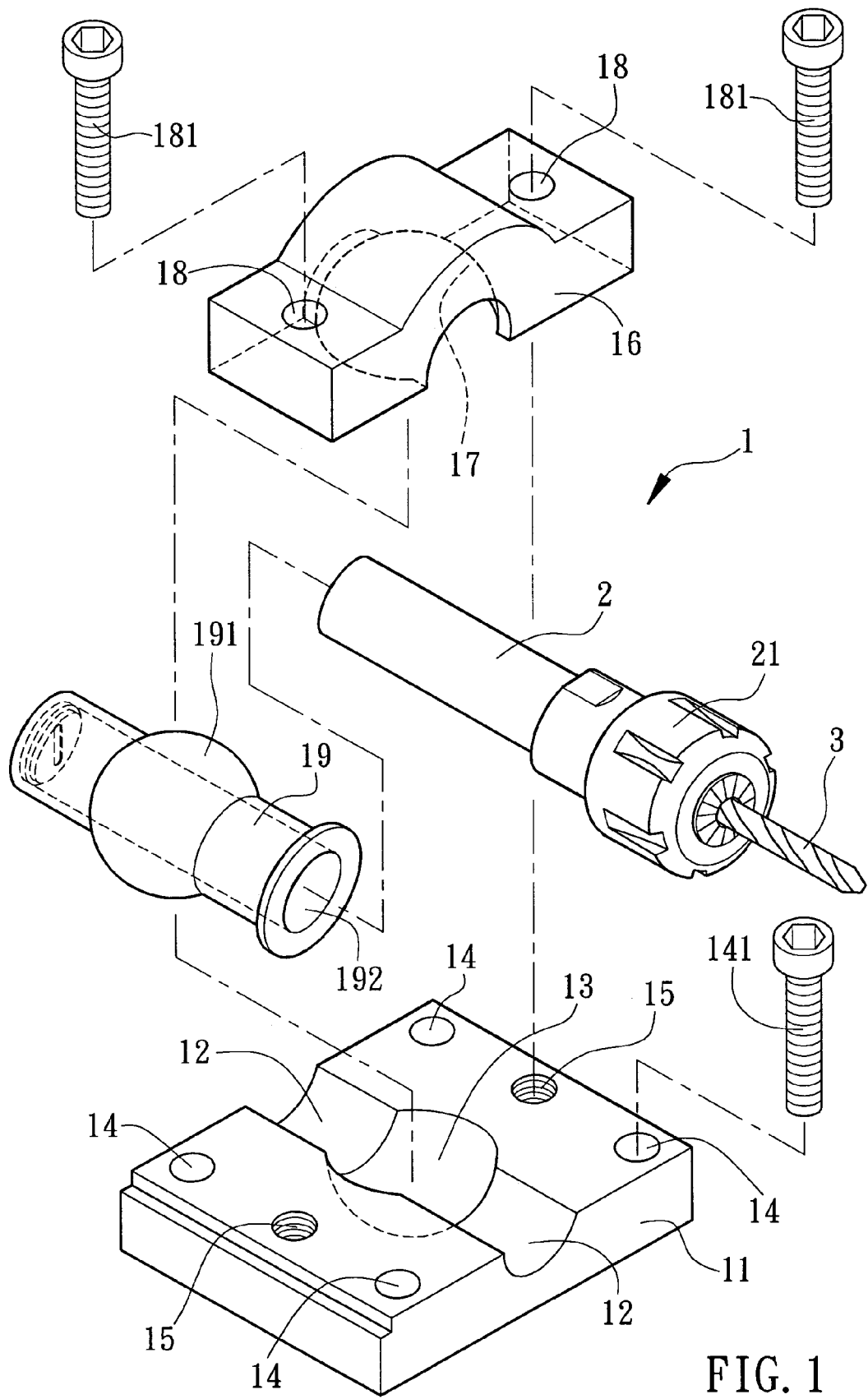
FIG. 1 is an exploded view of a center reference adjustable cutter holder according to the present invention.
Figure 2:
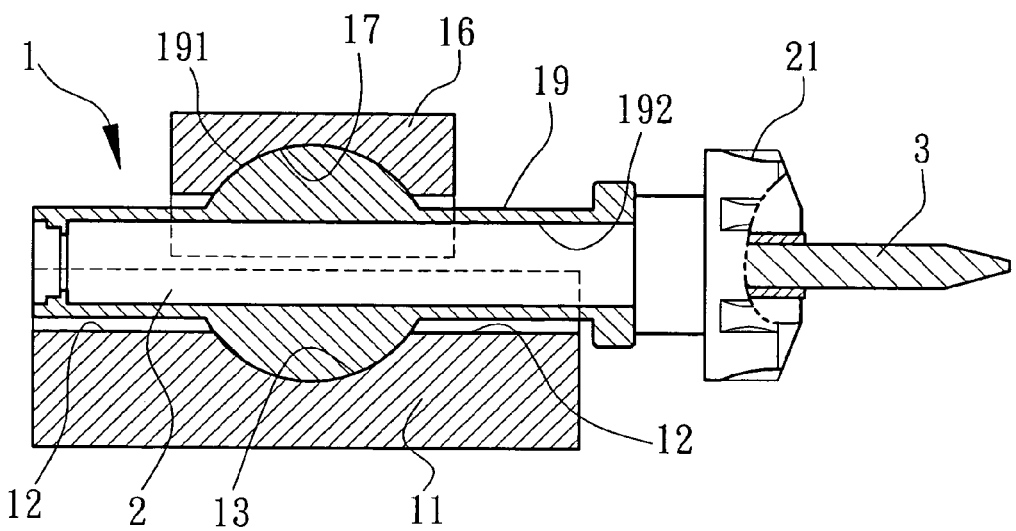
FIG. 2 is a sectional assembly view of the center reference adjustable cutter holder according to the present invention.
Figure 3:
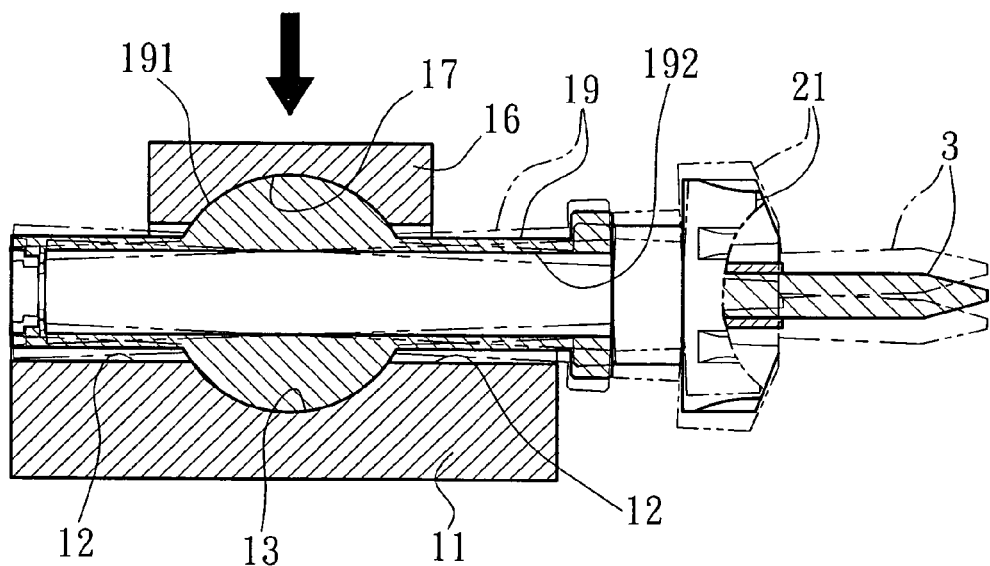
FIG. 3 corresponds to FIG. 2, showing the center reference of the cutter holder adjusted.
Figure 4:
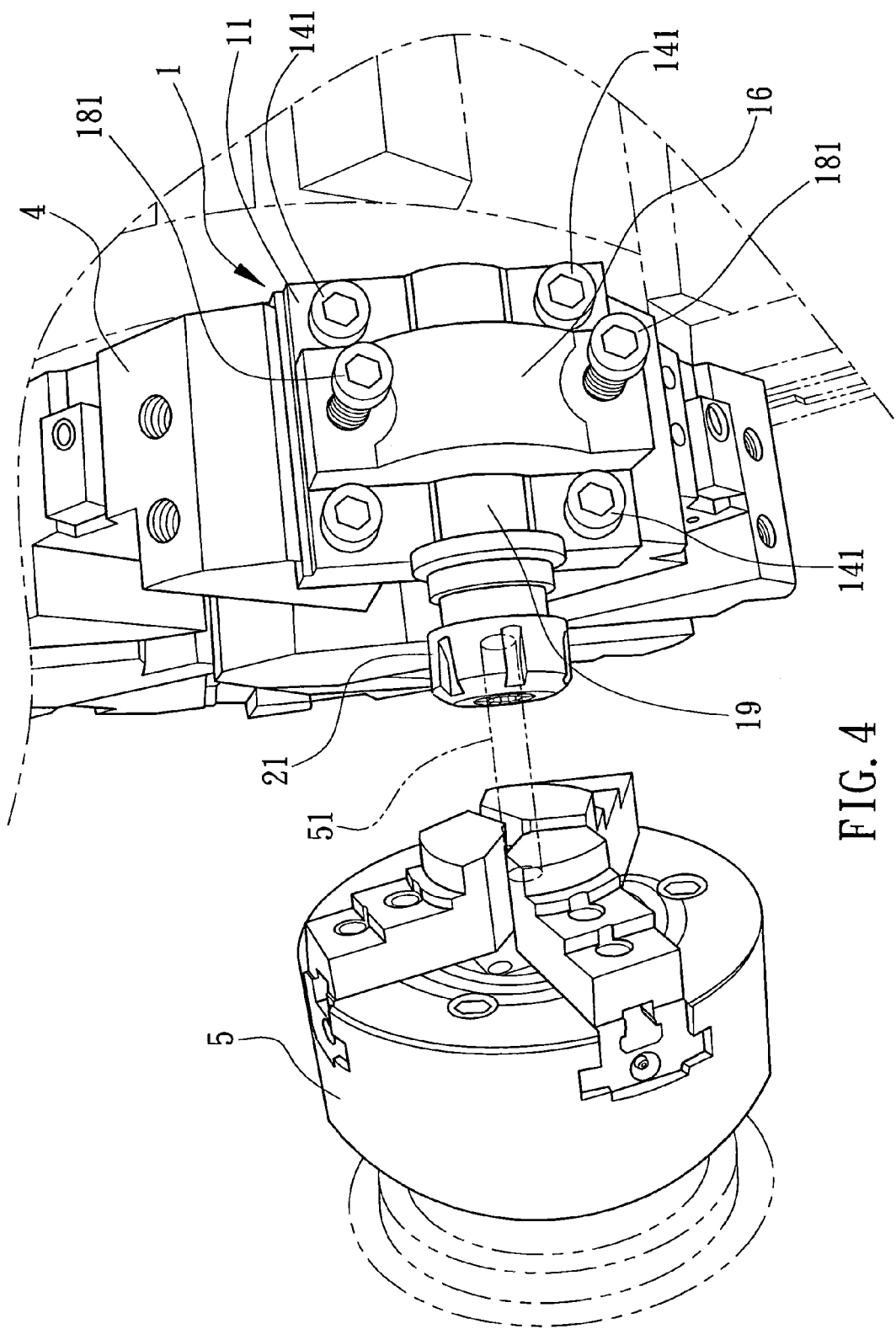
FIG. 4 is a schematic drawing showing the calibration of the position of the barrel in the tool holder with the use of a calibration rod.
Figure 5:
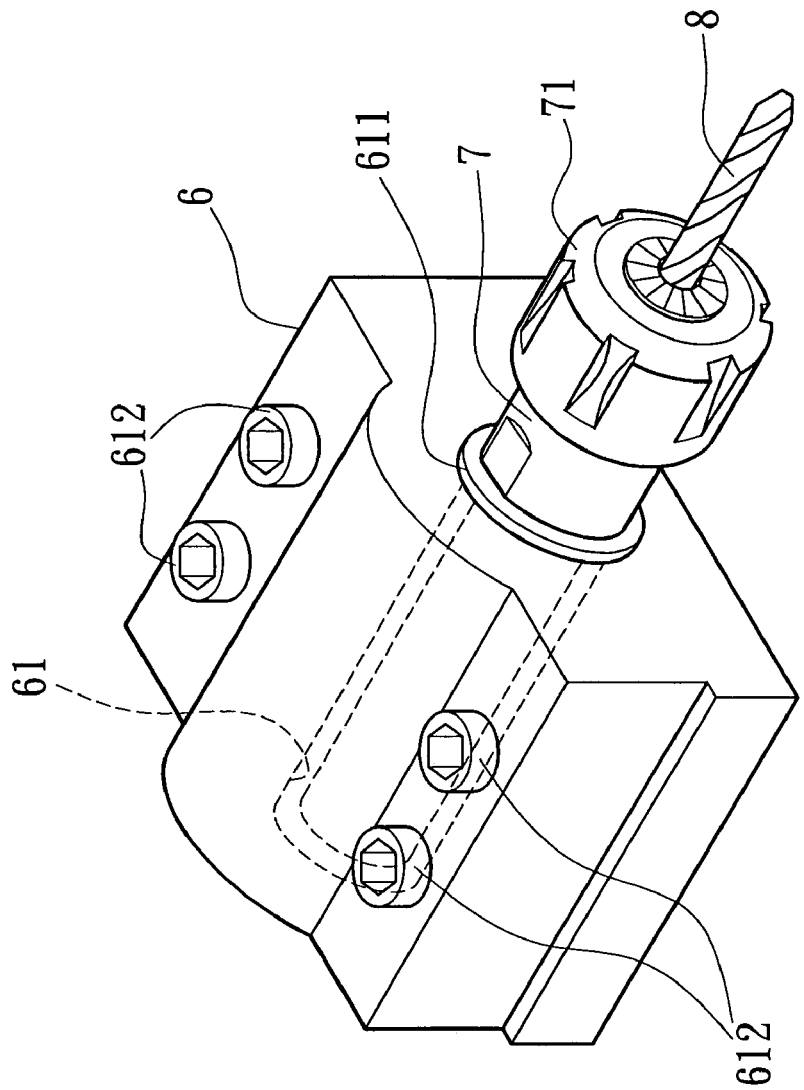
FIG. 5 is a perspective view of a cutter holder according to the prior art.
Figure 6:
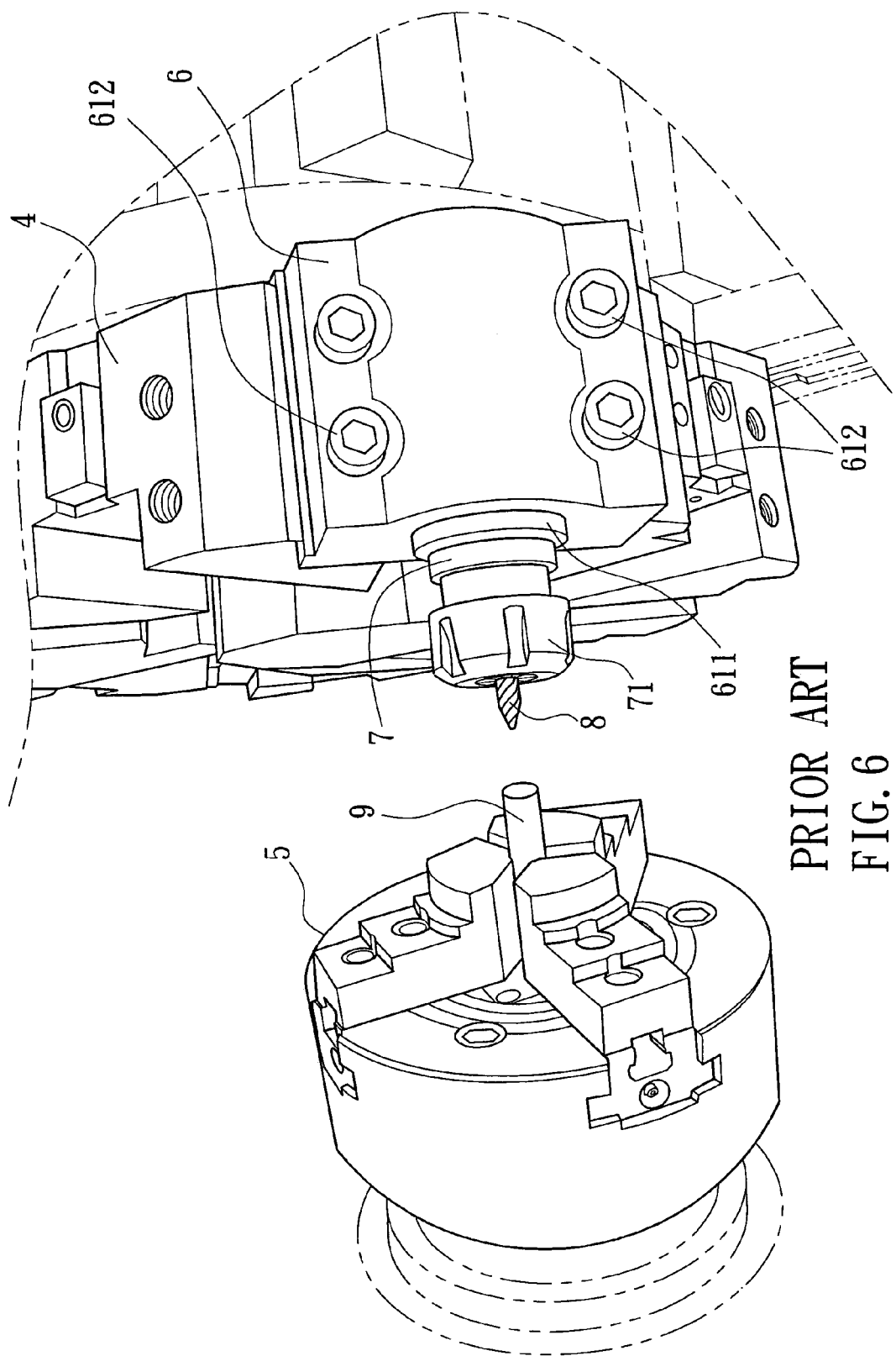
FIG. 6 shows an use of the cutter holder according to the prior art.

Referring to FIGS. 1~3, a cutter holder 1 for CNC lathe in accordance with the present invention is shown comprising a bottom holder block 11, a top holding down block 16, and a barrel 19. The barrel 19 has a spherical middle flank portion 191 and a center hole 192 extending through the two ends thereof. The bottom holder block 11 has a positioning groove 12 formed in the top wall and extending through the front and rear sides for accommodating the barrel 19, a semispherical top recess 13 formed in the top wall on the middle of the positioning groove 12 corresponding to the spherical middle flank portion 191 of the barrel 19. The top holding down block 16 has a semispherical bottom recess 17 corresponding to the semispherical top recess 13 of the bottom holder block 11. The bottom holder block 11 further has a plurality of mounting through holes 14 and two screw holes 15 respectively symmetrically disposed at two sides relative to the positioning groove 12. Screws 141 are respectively mounted in the mounting through holes 14 and threaded into a locating frame 4 at a CNC lathe to affix the bottom holder block 11 to the locating frame 4. A tool shank 2 is mounted in the center hole 192 of the barrel 19, having a front chuck 21 that holds a cutting tool 3. The top holding down block 16 is covered on the bottom holder block 11 to hold the barrel 19 in the positioning groove 12, having two mounting through holes 18 respectively connected to the screw holes 15 of the bottom holder block 11 by a respective screw 181.

Referring to FIG. 4 and FIGS. 1~3 again, after the cutter holder 1 has been installed in the locating frame 4 of the CNC lathe, a calibration rod 51 is fastened to the front chuck 21 of the tool shank 2, and then the two screws 181 are loosened, and then the other end of the calibration rod 51 is inserted into the center of the workpiece chuck 5 and firmly secured to the workpiece chuck 5, and then the barrel 19 is moved in the positioning groove 12 to calibrate the position of the tool shank 2, keeping the center reference of the front chuck 21 in axial alignment with the center reference of the calibration rod 51, and then the two screws 181 are fastened tight to affix the top holding down block 16 to the bottom holder block 11 and to hold down the barrel 19 and the tool shank 2 in the calibrated position. At this time, the calibration rod 51 can be removed from the workpiece chuck 5 and replaced by the workpiece, and the cutting tool 3 can be fastened to the front chuck 21 of the tool shank 2 for cutting the workpiece.

Although a particular embodiment of the invention has been described in detail for purposes of illustration, various modifications and enhancements may be made without departing from the spirit and scope of the invention.

What is claimed is:

1. A tool holder comprising:
a bottom holder block, said bottom holder block comprising a top wall, a positioning groove formed in said top wall and extending through front and rear sides thereof, a plurality of mounting through holes disposed at two sides relative to said positioning groove and fastened to a frame at a CNC lathe with screws, a plurality of screw holes symmetrically disposed at two sides relative to said positioning groove, and a semispherical recess formed in said top wall on a middle part of said positioning groove;

a barrel fitting the positioning groove of said bottom holder block, said barrel having a spherical middle flank portion fitting the semispherical recess of said bottom holder block, and a center hole extending through two distal ends thereof for holding a tool shank; and a holding down block adapted to hold down said barrel in said positioning groove of said bottom holder block, said holding down block having a semispherical bottom recess fitting the spherical middle flank portion of said barrel and a plurality of mounting through holes disposed at two sides of said semispherical bottom recess and respectively fastened to the screw holes of said bottom holder block with a respective screw.

2. The tool holder as claimed in claim 1, wherein said tool shank comprises a front chuck adapted to hold a cutting tool.

* * * * *